(12) United States Patent
Ward

(10) Patent No.: US 7,000,011 B1
(45) Date of Patent: *Feb. 14, 2006

(54) DESIGNING INTERCONNECT FABRICS

(75) Inventor: Julie Ann Ward, Menlo Park, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 817 days.

This patent is subject to a terminal disclaimer.

(21) Appl. No.: 09/707,227

(22) Filed: Nov. 6, 2000

(51) Int. Cl.
*G06F 15/177* (2006.01)

(52) U.S. Cl. ..................... 709/220; 370/442

(58) Field of Classification Search ........ 709/220–224, 709/243, 204, 236, 238, 245, 250, 242, 227, 709/230, 241, 203, 228, 231, 253; 714/4, 714/774; 455/572; 370/235, 255, 360, 399, 370/465, 242, 231, 395, 352, 388, 442, 216, 370/368, 241, 392; 398/2; 707/103; 379/220; 711/141; 716/12, 15; 713/153; 703/13; 718/104; 710/204, 23, 104; 717/11, 130; 340/825; 726/3

See application file for complete search history.

(56) References Cited

U.S. PATENT DOCUMENTS

| | | | |
|---|---|---|---|
| 3,806,657 A * | 4/1974 | Chow | 370/368 |
| 5,138,657 A * | 8/1992 | Colton et al. | 379/220.01 |
| 5,245,609 A * | 9/1993 | Ofek et al. | 370/235 |
| 5,321,813 A * | 6/1994 | McMillen et al. | 714/798 |
| 5,581,689 A * | 12/1996 | Slominski et al. | 714/4 |
| 5,649,105 A * | 7/1997 | Aldred et al. | 709/220 |
| 5,651,005 A * | 7/1997 | Kwok et al. | 370/399 |
| 5,793,362 A * | 8/1998 | Matthews et al. | 709/224 |
| 5,805,578 A * | 9/1998 | Stirpe et al. | 370/255 |
| 5,815,402 A * | 9/1998 | Taylor et al. | 716/12 |
| 5,838,919 A * | 11/1998 | Schwaller et al. | 709/224 |
| 5,987,517 A * | 11/1999 | Firth et al. | 709/230 |
| 6,003,037 A * | 12/1999 | Kassabgi et al. | 707/103 R |
| 6,038,219 A * | 3/2000 | Mawhinney et al. | 370/242 |
| 6,047,199 A * | 4/2000 | DeMarco | 455/572 |
| 6,052,360 A * | 4/2000 | Rogers | 370/216 |
| 6,076,117 A * | 6/2000 | Billings | 709/253 |
| 6,078,953 A * | 6/2000 | Vaid et al. | 709/223 |
| 6,088,356 A * | 7/2000 | Hendel et al. | 370/392 |
| 6,108,782 A * | 8/2000 | Fletcher et al. | 713/153 |
| 6,115,747 A * | 9/2000 | Billings et al. | 709/231 |
| 6,141,355 A * | 10/2000 | Palmer et al. | 370/465 |
| 6,157,645 A * | 12/2000 | Shobatake | 370/395.41 |
| 6,212,568 B1 * | 4/2001 | Miller et al. | 709/236 |

(Continued)

FOREIGN PATENT DOCUMENTS

WO WO96/17458 6/1996

OTHER PUBLICATIONS

A Congestion control algorithm for multipoint-to-multipoint ABR service in ATM network Pao, D.C.W.; IEEE Conference on , Jun. 26-29, 2000.*

(Continued)

*Primary Examiner*—Thong Vu
(74) *Attorney, Agent, or Firm*—Richard P. Lange

(57) ABSTRACT

A method for designing an interconnect fabric for communication between a set of source nodes and a set of terminal nodes. The method partitions the flow requirements of the interconnect fabric into flow-sets and merges the flow-sets to reduce insensibilities with respect to available ports on source and terminal nodes while taking into account costs and feasibility of implementation.

40 Claims, 7 Drawing Sheets

U.S. PATENT DOCUMENTS

| | | | |
|---|---|---|---|
| 6,331,905 B1 * | 12/2001 | Ellinas et al. | 398/2 |
| 6,336,129 B1 * | 1/2002 | Ise et al. | 709/201 |
| 6,345,048 B1 * | 2/2002 | Allen et al. | 370/352 |
| 6,363,334 B1 * | 3/2002 | Andrews et al. | 703/13 |
| 6,418,481 B1 * | 7/2002 | Mancusi et al. | 709/250 |
| 6,442,584 B1 * | 8/2002 | Kolli et al. | 718/104 |
| 6,452,924 B1 * | 9/2002 | Golden et al. | 370/352 |
| 6,519,632 B1 * | 2/2003 | Brackett et al. | 709/219 |
| 6,539,027 B1 * | 3/2003 | Cambron | 370/442 |
| 6,539,531 B1 * | 3/2003 | Miller et al. | 716/15 |
| 6,570,850 B1 * | 5/2003 | Gutierrez et al. | 370/231 |
| 6,598,080 B1 * | 7/2003 | Nagami et al. | 709/227 |
| 6,611,872 B1 * | 8/2003 | McCanne | 709/238 |
| 6,625,777 B1 * | 9/2003 | Levin et al. | 714/774 |
| 6,628,649 B1 * | 9/2003 | Raj et al. | 370/360 |
| 6,633,909 B1 * | 10/2003 | Barrett et al. | 709/224 |
| 6,650,639 B1 * | 11/2003 | Doherty et al. | 370/389 |
| 6,668,308 B1 * | 12/2003 | Barroso et al. | 711/141 |
| 6,675,328 B1 * | 1/2004 | Krishnamachari et al. | 714/704 |
| 6,694,361 B1 * | 2/2004 | Shah et al. | 709/222 |
| 6,697,369 B1 * | 2/2004 | Dziong et al. | 370/395.2 |
| 6,697,854 B1 * | 2/2004 | Glassen et al. | 709/222 |
| 6,707,794 B1 * | 3/2004 | Leong et al. | 370/241 |
| 6,724,757 B1 * | 4/2004 | Zadikian et al. | 370/388 |
| 6,744,767 B1 * | 6/2004 | Chiu et al. | 370/395.21 |
| 6,778,496 B1 * | 8/2004 | Meempat et al. | 370/230 |
| 6,804,245 B1 * | 10/2004 | Mitchem et al. | 370/395.31 |
| 6,807,558 B1 * | 10/2004 | Hassett et al. | 709/203 |
| 6,857,027 B1 * | 2/2005 | Lindeborg et al. | 709/239 |
| 6,870,847 B1 * | 3/2005 | Hughes et al. | 370/395.1 |
| 2002/0083159 A1 * | 6/2002 | Ward et al. | 709/220 |

OTHER PUBLICATIONS

Impact analysis of packet-level scheduling on an ATM shared-memory switch Fulton, C.; San-Qi Li; Lin, A.; IEEE, vol.: 3, Mar. 29-Apr. 2 1.*

RFC 2682 (rfc2682)—Performance Issues in VC-Merge Capable ATM LSRs www.faqs.org/rfcs/rfc2682.html.*

Assignment Decision Diagram for High-Level Synthesis—Chaiyakul, Gajski (1992); www.ics.uci.edu/pub/cad/cadlab-trs/1992/TR-92-103. assignment_decision_diagrams.ps.gz.*

Transit Note #118 Notes on Coupling Processors with Reconfigurable Logic; www.cs.caltech.edu/research/ic/transit/tn118/tn118.html.*

A. Richard Newton A. Richard Newton; www-cad.eecs.berkeley.edu/~newton/Classes/EE290sp99/lectur . . . 9912_1/ee290aSp9912_1.pdf.*

Evaluation of Jitter Introduced by ATM Switches and Workstations . . . —Achowdhu www.ir.iit.edu/~abdur/papers/jitterstudy.pdf.*

On Merging and Splitting of Self-Similar Traffic in . . . —Fan, Georganas (1995) www.mcrlab.uottawa.ca/papers/ICCC95.ps.gz.*

Time-stepped Hybrid Simulation (TSHS) For Large Scale Networks—Guo, Gong, Towsley (2000) www.ieee.infocom.org/2000/papers/612.ps.*

Yessir: A Simple Reservation Mechanism for the Internet—Pan, Schulzrinne (1998) www.cl.cam.ac.uk/Research/SRG/nossdav98/papers/nossdav98-032.ps.gz.*

Hiroshi Inose—"An Introduction to Digital Integrated Communications System"—Chapter 3—PCM Switching Technology—1979.

* cited by examiner

DESIGNING INTERCONNECT FABRICS

BACKGROUND OF THE INVENTION

1. Field of Invention

The present invention pertains to the field of networks. More particularly, this invention relates to designing interconnect fabrics of networks.

2. Art Background

A wide variety of networks may be viewed as a set of source nodes that communicate with a set of terminal nodes via an interconnect fabric. For example, a storage area network may be arranged as a set of computers as source nodes which are connected to a set of storage devices as terminal nodes via an interconnect fabric that includes communication links and devices such as hubs, routers, switches, etc. Devices such as hubs, routers, switches, etc., are hereinafter referred to as interconnect devices.

The communication requirements of an interconnect fabric may be characterized in terms of a set of flow requirements. A typical set of flow requirements specify the required communication bandwidth from each source node to each terminal node. The design of an interconnect fabric usually involves selecting the appropriate arrangement of physical communication links and interconnect devices and related components that will meet the flow requirements.

Prior methods for designing interconnect fabrics are usually based on manual design techniques. Such manual techniques may be based on heuristics and/or prepackaged structures. Unfortunately, such techniques are usually error prone and may result in an over-provisioned interconnect fabric that is more expensive than needed to meet the flow requirements. Moreover, such techniques are usually time-consuming and may require expert intervention, thereby increasing design costs.

SUMMARY OF THE INVENTION

A method is disclosed for designing an interconnect fabric for communication between a set of source nodes and a set of terminal nodes. The method partitions the flow requirements of the interconnect fabric into flow-sets and merges the flow-sets to reduce port violations with respect to available ports on source and terminal nodes while taking into account costs and feasibility of implementation.

In one embodiment, the method includes the steps of determining an arrangement of flow-sets in the interconnect fabric in response to a set of flow requirements for the source and terminal nodes. The method also includes determining one or more port violations in the source and terminal nodes which are associated with the arrangement of flow-sets and then alleviating at least one of the port violations by merging a pair of the flow-sets. The step of alleviating may be performed iteratively while taking into account the feasibility and costs of merging pairs of flow-sets.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
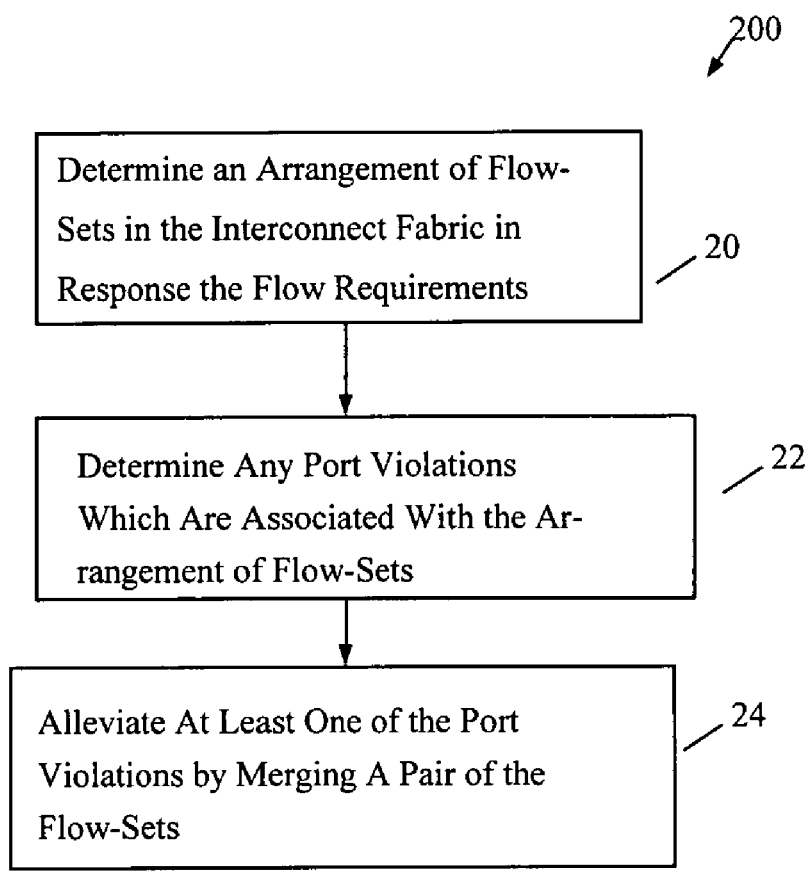
FIG. 1 shows a method for designing an interconnect fabric according to the present teachings.

FIG. 1 shows a method 200 for designing an interconnect fabric according to the present teachings. The method 200 partitions the flow requirements of the interconnect fabric into flow-sets and iteratively merges the flow-sets while taking into account the feasibility and cost of the implementing the interconnect fabric.

At step 20, an arrangement of flow-sets in the interconnect fabric is determined in response to a set of flow requirements for the source and terminal nodes. In one embodiment, step 20 is performed by generating a flow-set for each flow specified in the flow requirements for the interconnect fabric.

Table 1 shows an example set of flow requirements for an interconnect fabric under design.

TABLE 1

|  | Terminal Node 50 | Terminal Node 52 | Terminal Node 54 |
| --- | --- | --- | --- |
| Source Node 40 | a | b | c |
| Source Node 42 | d | e | f |
| Source Node 44 | — | g | h |

The flow requirements in this example specify three source nodes (source nodes 40–44 in the figure below) and three terminal nodes (terminal nodes 50–54 in the figures below). If an interconnect fabric is to meet the flow requirements, it must contain communication paths between all pairs of the source and terminal nodes 40–44 and 50–54 having positive flow requirements and must have sufficient bandwidth to support all of the flow requirements simultaneously.

In one embodiment, the source nodes 40–44 are host computers and terminal nodes 50–52 are storage devices and the bandwidth values a–h are numbers expressed in units of megabits per second.

In other embodiments, there may be multiple flow requirements between a given source and terminal node pair. In such embodiments, the cells of Table 1 would contain a list of two or more entries.

Figure 2:
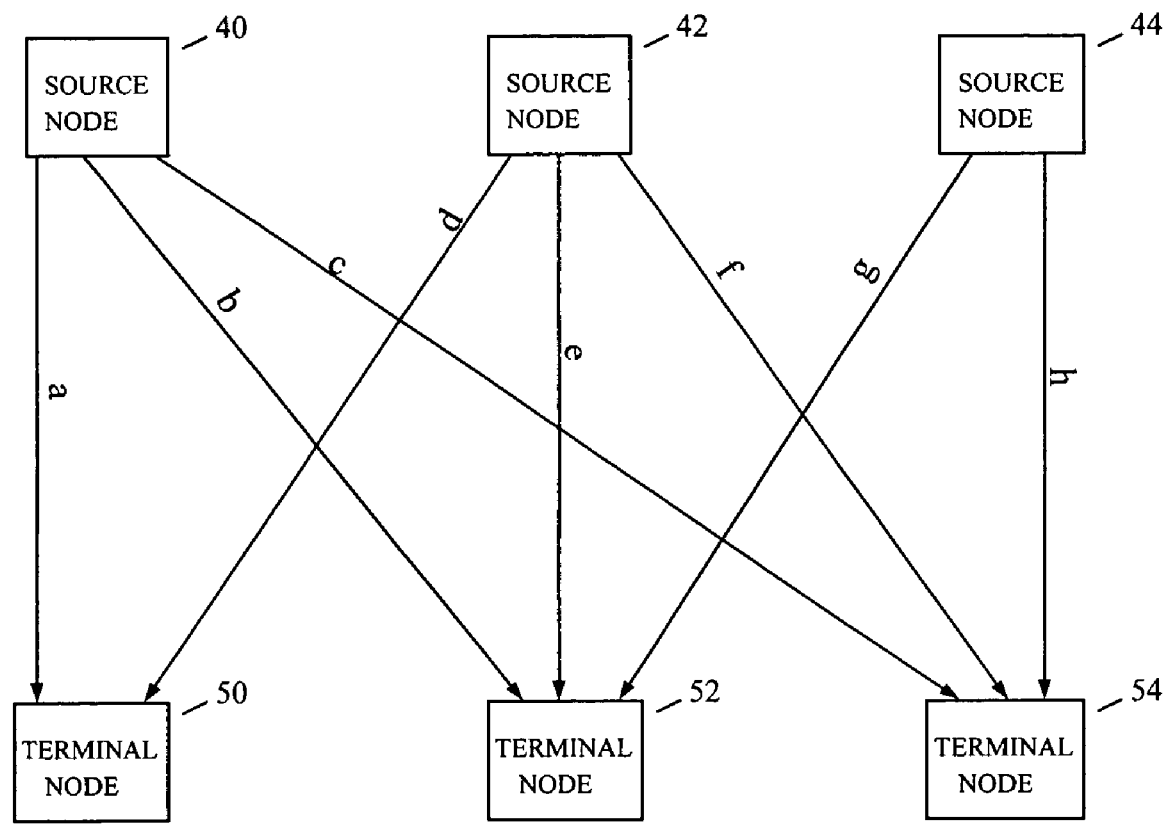
FIGS. 2–6 shows an evolving arrangement of flow-sets in an interconnect fabric for an example design according to the present teachings.

FIG. 2 shows an initial arrangement of flow-sets in the interconnect fabric obtained at step 20 for this example. Initially, a flow-set is generated for each flow set forth in the flow requirements. Accordingly, a flow-set having a flow of a is generated for a connection between the source node 40 and the terminal node 50, a flow-set having a flow of b is generated for a connection between the source node 40 and the terminal node 52, and a flow-set having a flow of c is generated for a connection between the source node 40 and the terminal node 54. Similarly, flow-sets having flows of d, e, and f, respectively, are generated for connections from the source node 42 to the terminal nodes 50–54 and flow-sets having flows of g and h, respectively, are generated for connections from the source node 44 to the terminal nodes 52–54.

At step 22, port violations which are associated with the arrangement of flow-sets in the interconnect fabric are determined. Port violations are determined for each source node 40–42 and each terminal node 50–52. In general, the number of port violations for a node is equal to the sum, over all flow-sets, of the number of required physical communication links to the node from that flow-set, minus the number of available ports in the node because each flow-set may require one or more physical communication links to a given source or terminal node in the network. In this example, the number of port violations for a node is equal to the number of flow-sets connected to the node minus the number of available ports in the node because each flow-set is carried by one physical communication link in the interconnect fabric.

In this example, each source node 40–42 and each terminal node 50–52 has two available ports for connections to the interconnect fabric. Therefore, the source node 40 has a port violation of one since each of its three flow-sets requires one physical communication link to the source node 40 and the source node 40 has only two available ports. Similarly, the source nodes 42–44 have port violations of one and zero, respectively, and the terminal nodes 50–54 have port violations of zero, one, and one, respectively, in the interconnect fabric. In other examples, the number of available ports on the source nodes 40–42 and the terminal nodes 50–52 may differ and the number of physical communication links required by a flow-set on a given source or terminal node it connects to may exceed one.

At step 24, at least one of the port violations is alleviated by merging a pair of the flow-sets. Step 24 initially involves selecting the pair of flow-sets in the current interconnect fabric that are to be merged. Initially, a candidate pair of flow-sets is chosen that would alleviate the port violation on a node with the greatest port violation if merged. If there is more than one such candidate pair then one of the candidate pairs that alleviates a port violation on a node having the next greatest port violation is chosen from among them. If there is more than one such candidate pair then a pair of them that would be least costly to merge is chosen. The cost of merging two candidate pairs may be determined by choosing the least expensive interconnect device that is feasible for the merged flow-set.

In the current state of the example interconnect fabric shown in FIG. 2, the source nodes 40–42 and the terminal nodes 52–54 each have a port violation of one, which is the worst port violation in the network, and their corresponding flow-sets are candidates for merging at step 24. For example, the pair of flow-sets having flows a and b or the pair of flow-sets having flows a and c or the pair of flow-sets having flows b and c are chosen as candidate pairs. All of these candidate pairs if merged would alleviate one port violation from the source node 40 but none of them would alleviate any other port violations. The same may be said for mergers of any two of the flow-sets having flows d, e, and f, any two of the flow-sets having flows b, e, and g, and any two of the flow-sets having flows c, f, and h. Therefore, the cost of merging the candidate pairs is used to select the candidate pair of flow-sets having flows b and c for merger at step 24. For example, the communication link and/or interconnect device and/or ports that are used to merge the flow-sets having flows b and c may be less expensive than the equivalent components needed to merge the other equally qualified candidate pairs.

The candidate pairs of flow-sets considered at step 24 must be feasible to merge. An example of a pair of flow-sets that is not feasible to merge is a pair for which an interconnect device of sufficient bandwidth is not available. For example, a flow-set having 60 units of bandwidth cannot be merged with a flow-set having 50 units of bandwidth if the highest bandwidth interconnect device available is 100 units. Another example of a pair of flow-sets that is not feasible to merge is a pair that would exceed the available ports on every available interconnect device of the resulting flow-set. Candidate pairs that are not feasible to merge are bypassed at step 24 in favor of other candidate pairs.

If port violations still exist in the interconnect fabric after step 24, then another candidate pair of flow-sets is selected and merged in a repeat of step 24. The method 200 loops through steps 22–24 in an iterative fashion until all port violations are eliminated or until no further merges are feasible.

Figure 3:
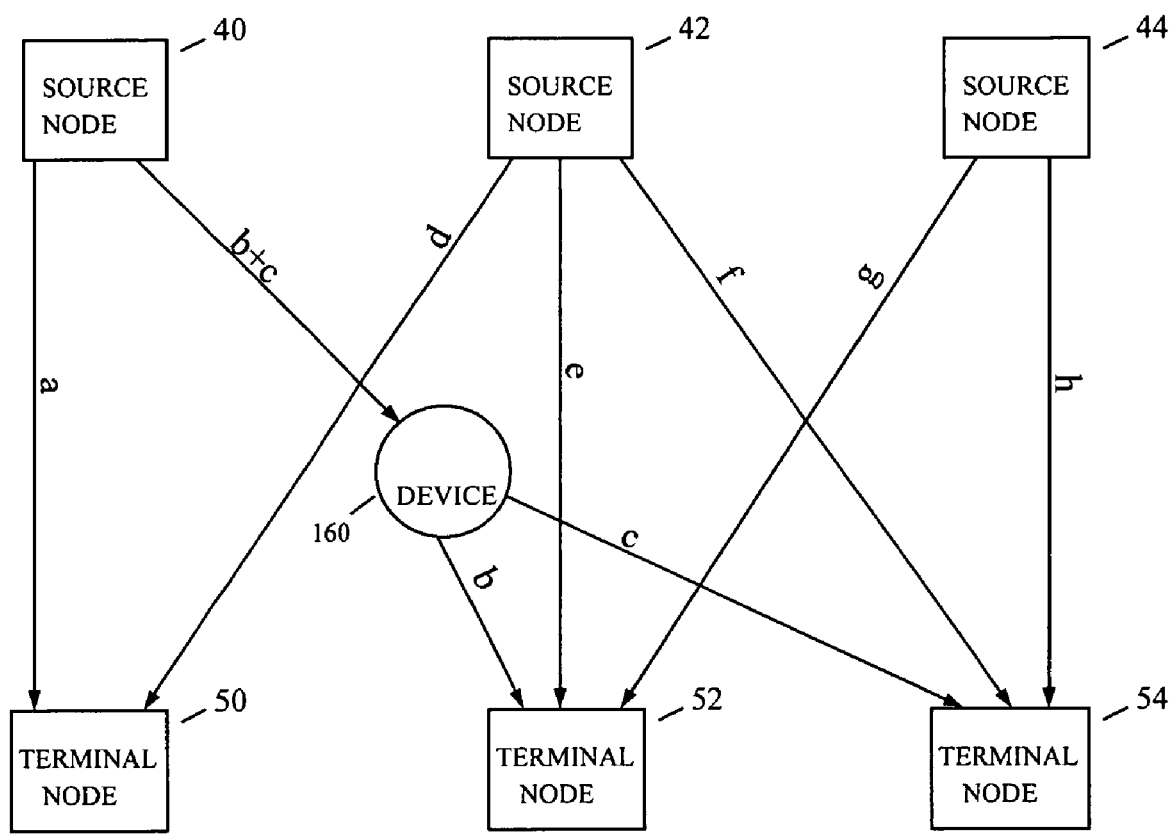

FIG. 3 shows an interconnect fabric that results from the first pass through step 24. A flow-set having an interconnect device 160, a flow of b, and a flow of c is the result of the merger of the flow-set having the flow of b and the flow-set having the flow of c. At this point, the interconnect fabric has a port violation of one at the source node 42 and a port violation of one at each of the terminal nodes 52 and 54. The next pass through step 24 results in the selection and merger of the flow-set corresponding to the interconnect device 160 with the flow-set having the flow of e which will alleviate the port violation of the terminal node 52.

Figure 4:
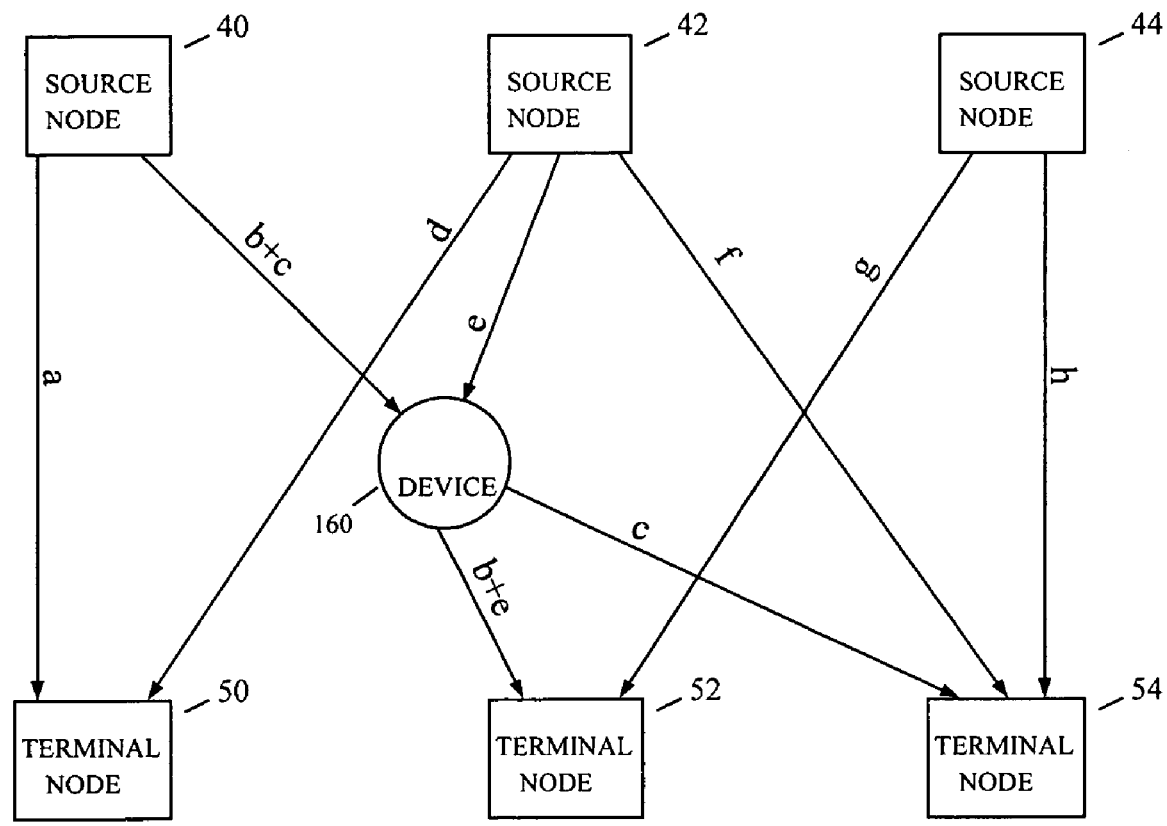

FIG. 4 shows an interconnect fabric that results from the second pass through step 24. The flow-set corresponding to the interconnect device 160 now carries the flow of e in addition to the flows of b and c. At this point, the interconnect fabric has a port violation of one at the source node 42 and a port violation of one at the terminal node 54. The next pass through step 24 results in the selection and merger of the flow-set having the flow of f with the flow-set corresponding to the interconnect device 160 which will alleviate the port violation of the source node 42 as well as the port violation of the terminal node 54.

Figure 5:
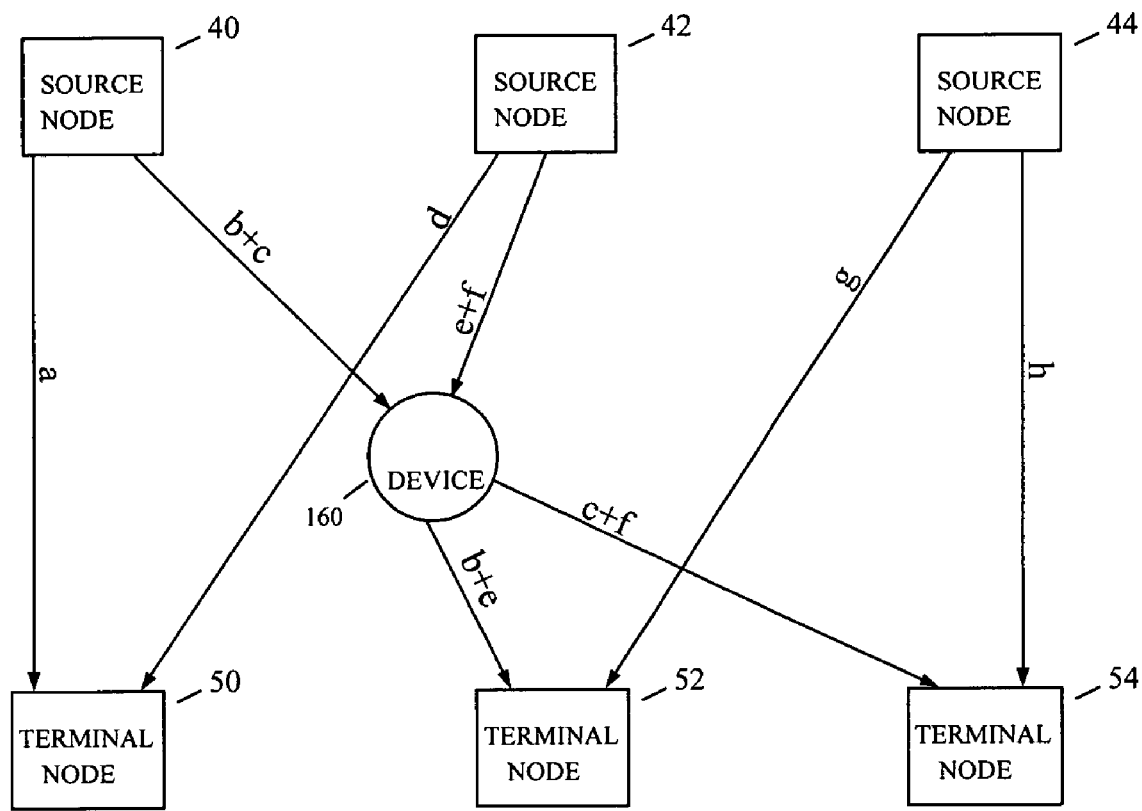

FIG. 5 shows an interconnect fabric that results from the third pass through step 24. The flow-set corresponding to the interconnect device 160 now carries the flow of f as well as the flows b, c, and e. At this point, the interconnect fabric has no port violation remaining. However, a cost saving may be obtained by merging the flow-set having the flow of a into the flow-set corresponding to the interconnect device 160. That merger would obviate the need for a communication link between the source node 40 and the terminal node 50, replacing that link with one between the interconnect node 160 and the terminal node 50, and thereby saving the costs associated with a port on the source node 40 in exchange for the lower costs, in this example, of a port on the interconnect node 160.

Figure 6:
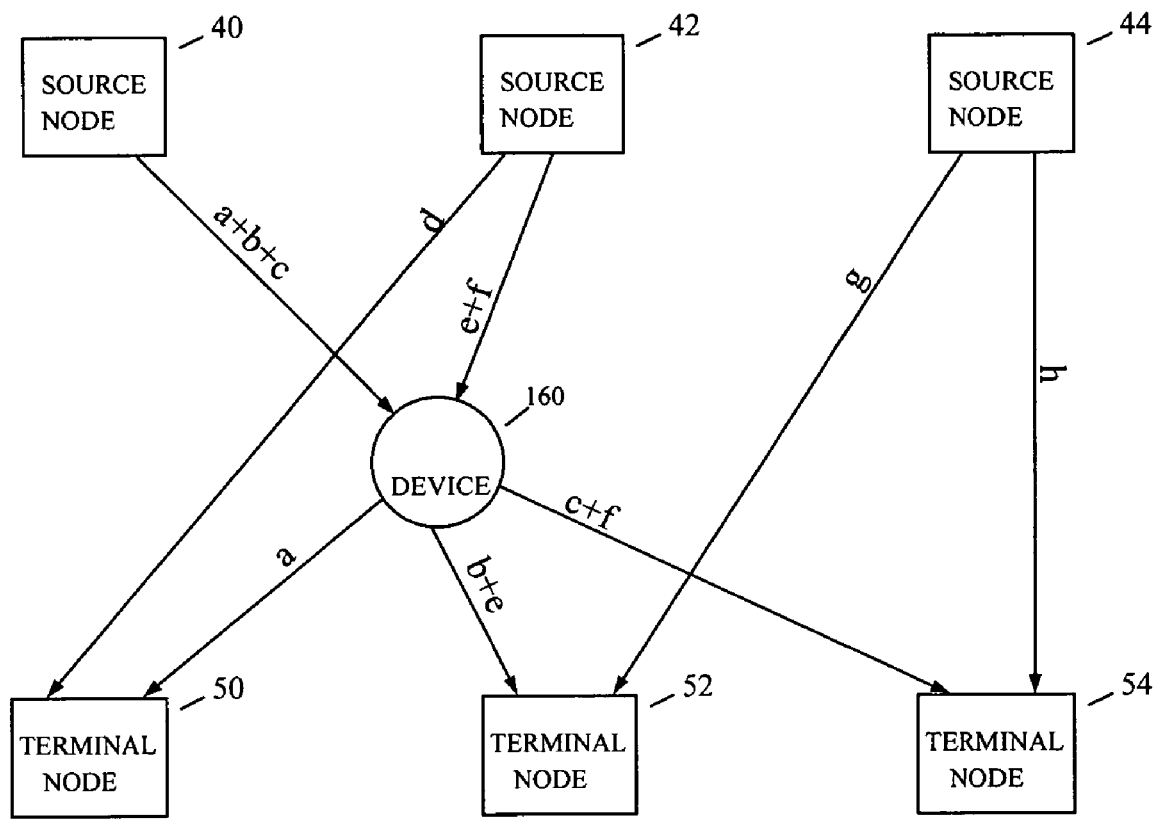

FIG. 6 shows an interconnect fabric that results from merging the flow-set having the flow of a into the flow-set corresponding to the interconnect device 160. The flow-set corresponding to the interconnect device 160 now includes the flow a in addition to the flows of b, c, e, and f. At this point, the interconnect fabric has no port violation remaining and no remaining opportunities for cost saving.

Each flow-set has at most one interconnect device associated with it and all of the flows for the flow-set are routed through that interconnect device or a single communication link if possible. When a pair of flow-sets are merged, their existing interconnect devices, if any, are replaced by a single interconnect device which may be of a different type than the replaced interconnect devices. Usually, the interconnect device that results in the least expensive routing of the flows in the flow-set is chosen from among those interconnect devices that are feasible for the flow-set.

Figure 7:
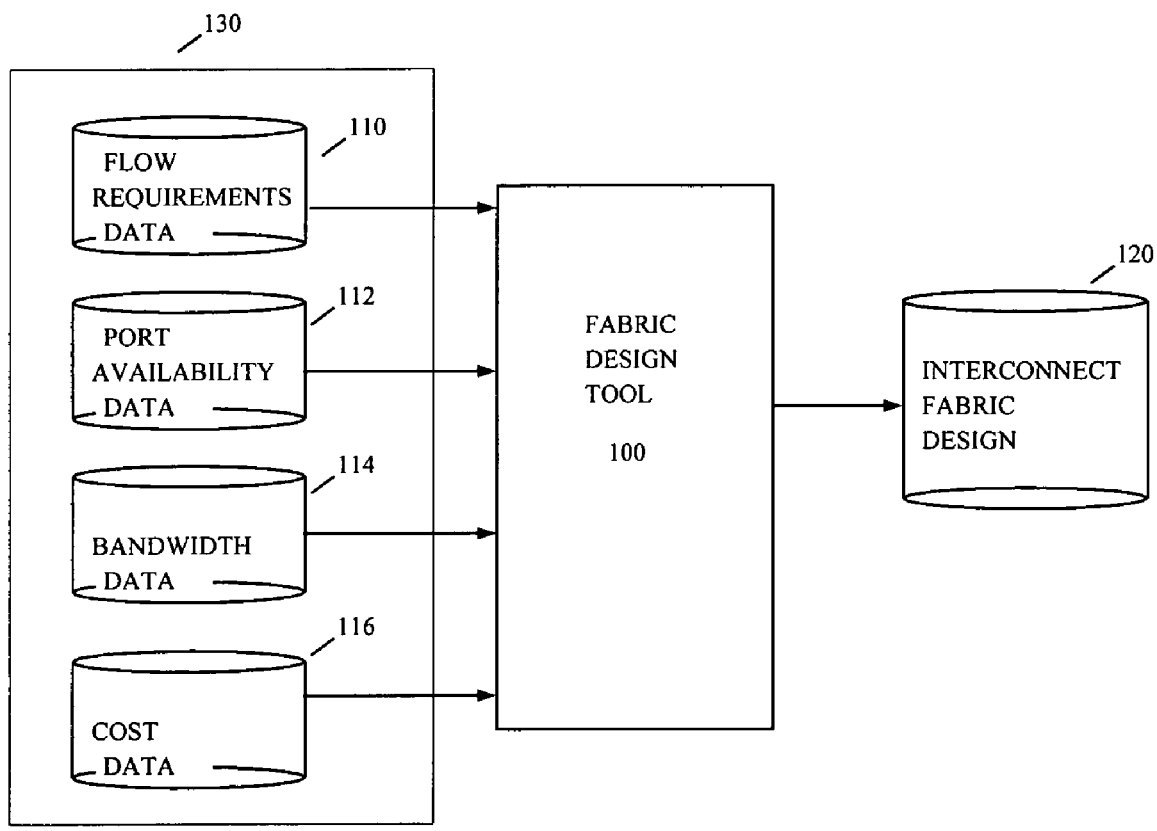
FIG. 7 shows a fabric design tool that employs the present techniques to generate an interconnect fabric design in response to a set of design information.

FIG. 7 shows a system having a fabric design tool 100 that employs the method 200 to generate an interconnect fabric design 120 in response to a set of design information 130. The fabric design tool 100 may be implemented in software. The design information 130 in one embodiment includes a set of flow requirements data 110, a set of port availability data 112, a set of bandwidth data 114, and a set of cost data 116. The design information may be implemented as an information store such as a file or set of files, a database or databases, etc.

The flow requirements data 110 specifies the desired flow requirements for the interconnect fabric design 120. The desired flow requirements include a list of source nodes, a list of terminal nodes and one or more bandwidth requirements for each pairing of the source and terminal nodes.

The port availability data 112 specifies the number of communication ports available on each source node and each terminal node and each available interconnect device.

The available component data 114 specifies a list of available communication links that may be employed in the interconnect fabric design 120 and specifies the bandwidth provided by each and any other relevant constraints. There are numerous examples of available communication links including fiber optic links, fibre channel links, wire-based links, and links such as SCSI as well as wireless links. The available component data 114 also specifies a list of available interconnect devices such as switching hubs, repeaters, etc., and port bandwidth, device bandwidth, and other relevant information.

The cost data 116 specifies costs associated with the available communication links and interconnect devices that may be employed in the interconnect fabric design 120. The cost data 116 also specifies the costs of ports for source and terminal nodes and interconnect devices. Other relevant costs may also be indicated.

The interconnect fabric design 120 generated by the fabric design tool 100 includes a list of the physical communication links and interconnect devices and ports, etc. and may include cost data.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method, comprising:
   designing an interconnect fabric for communication between a set of source nodes and a set of terminal nodes by:
   generating an arrangement of flow-sets in the interconnect fabric in response to a set of flow requirements for the source and terminal nodes;
   determining one or more port violations in the source and terminal nodes which are associated with the arrangement of flow-sets;
   alleviating at least one of the port violations by merging a pair of the flow-sets, wherein the step of alleviating at least one of the port violations by merging a pair of the flow-sets is repeated to complete the design of the interconnect fabric.

2. The method of claim 1, wherein the step of generating an arrangement of flow-sets comprises the step of generating a flow-set for each flow requirement for the source and terminal nodes.

3. The method of claim 1, wherein for each source and terminal node the step of determining one or more port violations comprises the step of determining a number by which a set of ports for the corresponding flow-sets exceed a set of available ports.

4. The method of claim 3, wherein the step of alleviating at least one of the port violations comprises the step of alleviating at least one port violation of the source or terminal node for which the number is highest.

5. The method of claim 3, wherein the step of alleviating at least one of the port violations comprises the step of alleviating at least one port violation of the source or terminal node for which the number is highest and for which the step of merging also alleviates the source or terminal node for which the number is next highest.

6. The method of claim 3, wherein the step of alleviating at least one of the port violations comprises the step of alleviating at least one port violation of the source or terminal node for which the number is highest and for which the step of merging imposes a least cost.

7. The method of claim 6, wherein the least cost is based on a cost of an interconnect device that carries the pair of flow-sets.

8. The method of claim 1, wherein the step of merging a pair of the flow-sets comprises the step of selecting the pair by determining a feasibility of merging the pair.

9. The method of claim 8, wherein the step of determining a feasibility comprises the step of determining whether an available interconnect device has sufficient bandwidth to carry the pair of flow-sets.

10. The method of claim 8, wherein the step of determining a feasibility comprises the step of determining whether an available interconnect device has enough ports to carry the pair of flow-sets.

11. The method of claim 1, wherein generating an arrangement of flow-sets in the interconnect fabric is further in response to port availability data, communication link data, and interconnect device data.

12. The method of claim 11 wherein;
   the port availability data includes data on available communication ports for each source node and for each terminal node;
   the communication link data includes data on bandwidth for communicating links of the interconnect fabric; and
   the interconnect device data includes dam an at least one interconnect device that is communicatively linked to both the set of source nodes and the set of terminal nodes.

13. The method of claim 11, wherein generating an arrangement of flow-sets in the interconnect fabric is further in response to cost data that includes costs for communicating links, costs for interconnect devices, and costs for ports of the source nodes and the terminal nodes.

14. The method of claim 1, wherein a port violation in the source or terminal nodes is equal to a number of required physical communication links to the node minus a number of available ports in the node.

15. The method of claim 1, wherein a port violation in the source or terminal nodes is equal to a number of flow-sets to the node minus a number of available ports in the node.

16. The method of claim 1, wherein merging a pair of flow-sets further comprises merging a pair of flow-sets that alleviates a port violation on a node that has more port violations than any other node.

17. The method of claim 1, wherein the repetition continues until all port violations are eliminated or until no further mergers are possible.

18. A system, comprising:
a set of design information including a set of flow requirements for an interconnect fabric;
fabric design tool for designing the interconnect fabric for communication between a set of source nodes and a set of terminal nodes, wherein the fabric design tool generates a design for the interconnect fabric in response to the design information by generating an arrangement of flow-sets in response to the flow requirements and determining one or more port violations in the source and terminal nodes which are associated with the arrangement of flow-sets and alleviating at least one of the port violations by merging a pair of the flow-sets.

19. The system of claim 18, wherein the arrangement of flow-sets includes a flow-set for each flow requirement.

20. The system of claim 18, wherein the fabric design tool determines the port violations for each source and terminal node by determining a number by which a set of ports for the corresponding flow-sets exceed a set of available ports.

21. The system of claim 20, wherein the fabric design tool alleviates at least one port violation of the source or terminal node for which the number is highest.

22. The system of claim 20, wherein the fabric design tool alleviates at least one port violation of the source or terminal node for which the number is highest and for which the merger also alleviates the source or terminal node for which the number is next highest.

23. The system of claim 20, wherein the fabric design tool alleviates at least one port violation of the source or terminal node for which the number is highest and for which the merger imposes a least cost.

24. The system of claim 23, wherein the fabric design tool determines the least cost in response to a set of cost information contained in the design information.

25. The system of claim 18, wherein the fabric design tool selects a pair of the flow-sets for merger by determining a feasibility of merging the pair.

26. The system of claim 25, wherein the fabric design tool determines the feasibility based on a set of information in the design information that indicates whether an available interconnect device has sufficient bandwidth to carry the pair of flow-sets.

27. The system of claim 25, wherein the fabric design tool determines the feasibility based on a set of information in the design information that indicates whether an available interconnect device has enough ports to carry the pair of flow-sets.

28. The system of claim 18, wherein alleviating at least one of the port violations by merging a pair of the flow-sets is repeated to complete the design of the interconnect fabric.

29. The method of claim 28, wherein the repetition continues until all port violations are eliminated or until no further mergers are possible.

30. The system of claim 18, wherein the set of design information further includes port availability data, communication link data, and interconnect device data.

31. The system of claim 30 wherein:
the port availability data includes data on available communication ports for each source node and for each terminal node;
the communication link data includes data on bandwidth for communicating links of the interconnect fabric; and
the interconnect device data includes data on at least one interconnect device that is communicatively linked to both the set of source nodes and the set of terminal nodes.

32. The system of claim 30, wherein the set of design information further comprises cost data that includes costs for communicating links, costs for interconnect devices, and costs for ports of the source nodes and the terminal nodes.

33. The system of claim 18, wherein a port violation in the source or terminal nodes is equal to a number of required physical communication links to the node minus a number of available ports in the node.

34. The system of claim 18, wherein a port violation in the source or terminal nodes is equal to a number of flow-sets to the node minus a number of available ports in the node.

35. The system of claim 18, wherein merging a pair of flow-sets further comprises merging a pair of flow-sets that alleviates a port violation on a node that has more port violations than any other node.

36. A computer-readable medium having computer-readable program code to perform:
designing an interconnect fabric of a network for communication between source nodes and terminal nodes using at least one interconnect device communicatively coupled between at least one source node and one terminal node by:
receiving design information comprising flow requirement data, including bandwidth data, for the source nodes and the terminal nodes, port availability data for the source and terminal nodes, communication link data for communication links connecting the interconnect fabric, and interconnect data for the interconnect device;
generating, using the design information, a plurality of flow-sets that communicatively couple the source nodes and terminal nodes;
identifying at least one port violation in one of the source nodes and terminal nodes; and
merging at least one flow-set into another flow set to alleviate the at least one port violation.

37. The computer-readable medium of claim 36, wherein the at least one port violations in the source or terminal nodes is equal to a number of flow-sets to the node minus a number of available ports in the node.

38. The computer-readable medium of claim 36 further comprising:
identifying every port violation of the source nodes and terminal nodes; and
merging flow-sets into each other and providing interconnect devices between the source nodes and terminal nodes until every port violation is alleviated.

39. The computer-readable medium of claim 36 wherein merging at least one flow-set into another flow set to alleviate the at least one port violation is repeated to complete the design of the interconnect fabric.

40. The computer-readable medium of claim 39, wherein the repetition continues until all port violations are eliminated or until no further mergers are possible.

* * * * *

UNITED STATES PATENT AND TRADEMARK OFFICE
CERTIFICATE OF CORRECTION

| | | |
|---|---|---|
| PATENT NO. | : 7,000,011 B1 | Page 1 of 1 |
| APPLICATION NO. | : 09/707227 | |
| DATED | : February 14, 2006 | |
| INVENTOR(S) | : Julie Ann Ward | |

It is certified that error appears in the above-identified patent and that said Letters Patent is hereby corrected as shown below:

On the Title Page Item (73), in "Assignee", line 2, delete "LP." and insert -- L.P. --, therefor.

In column 6, line 39, in Claim 12, delete "wherein;" and insert -- wherein: --, therefor.

In column 6, line 45, in Claim 12, delete "dam an" and insert -- data on --, therefor.

Signed and Sealed this

Sixth Day of July, 2010

David J. Kappos
*Director of the United States Patent and Trademark Office*